March 10, 1964  F. R. LARSEN  3,124,082
TRACK INTERLOCK AND SAFETY STOP MEANS
Filed Jan. 28, 1963  2 Sheets-Sheet 1
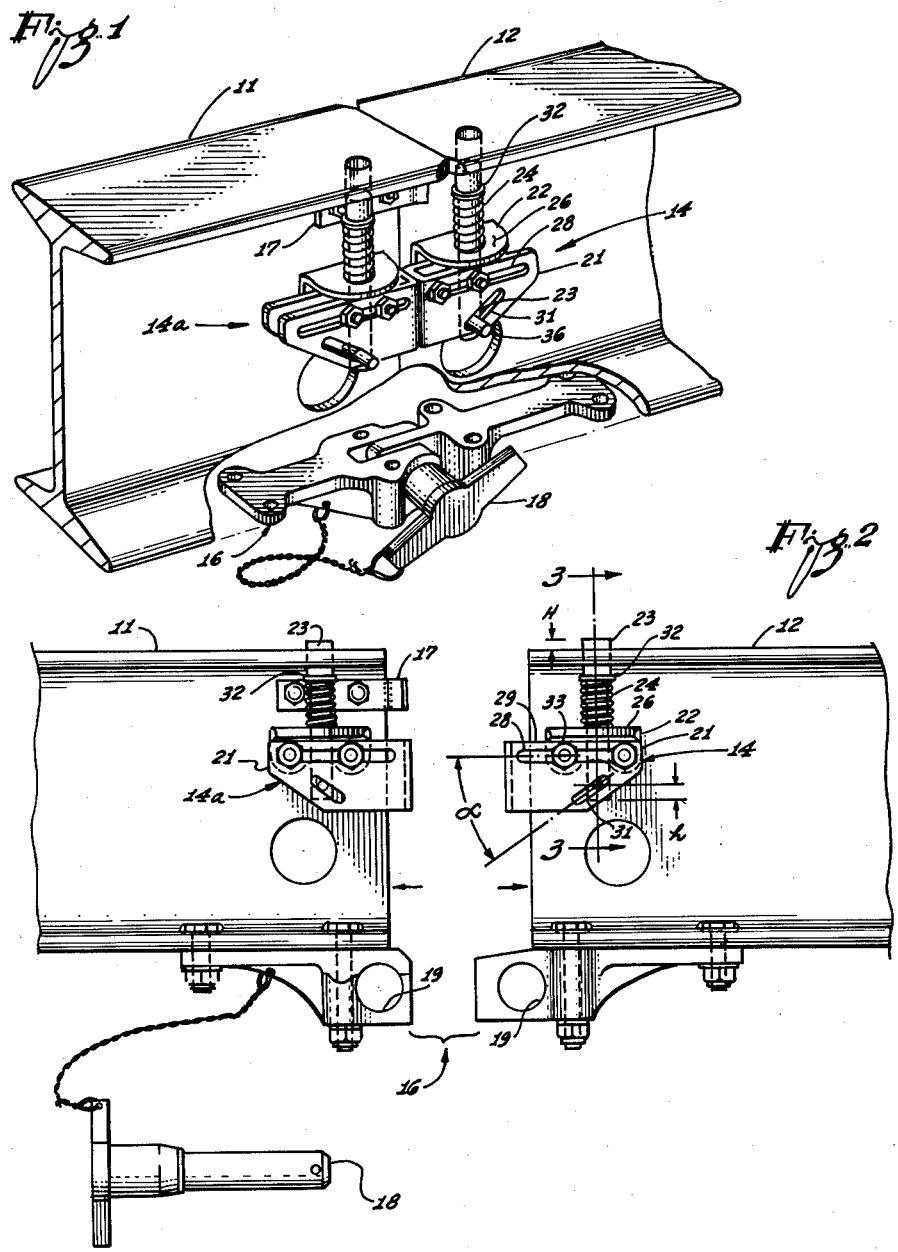
INVENTOR:
Frank R. Larsen
Agent

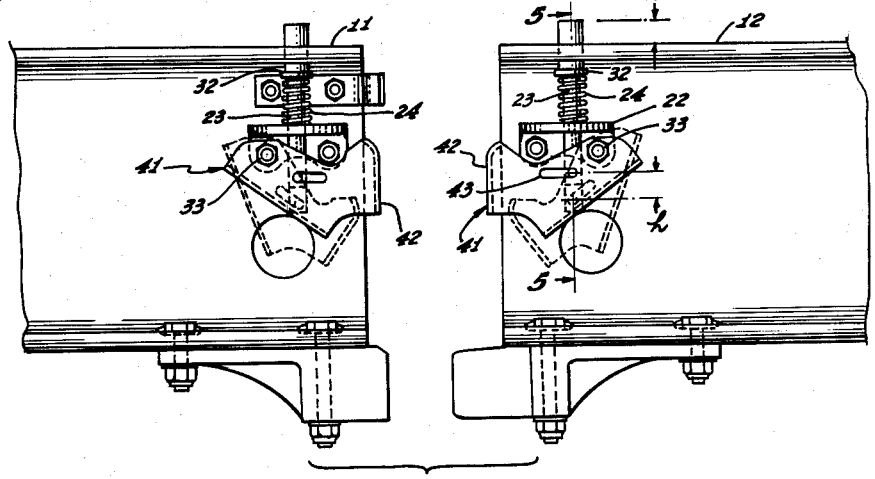
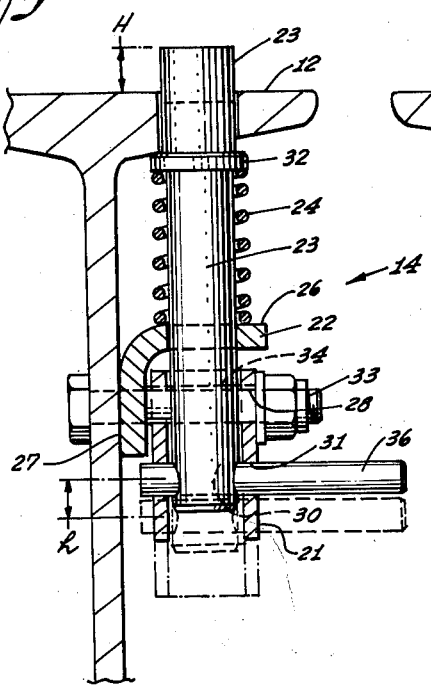
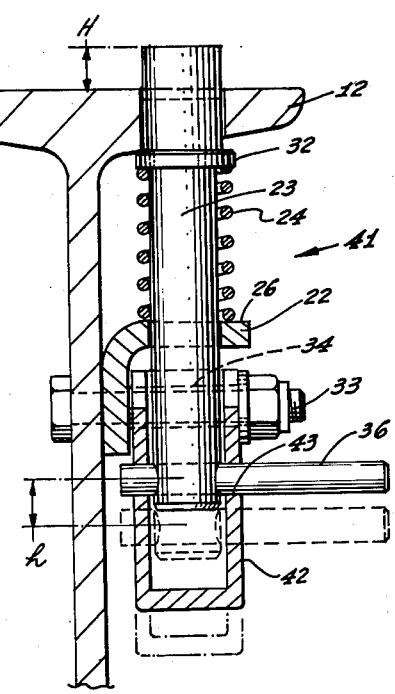

United States Patent Office 3,124,082
Patented Mar. 10, 1964

3,124,082
TRACK INTERLOCK AND SAFETY STOP MEANS
Frank R. Larsen, Temple City, Calif., assignor, by mesne assignments, to Northrop Corporation, Beverly Hills, Calif., a corporation of California
Filed Jan. 28, 1963, Ser. No. 254,262
4 Claims. (Cl. 104—98)

This invention pertains to improvements in material handling equipment and more particularly to depressor and stop means, associated with the load carrying rails of a transportation trailer or the like, functioning automatically in response to and at such times as a contacting relation is established therebetween and similar means mounted on corresponding load carrying rails.

The depressor and stop means as disclosed herein functions to provide the same result as the manually actuated stop means shown in FIGURES 17 and 17a of U.S. Patent No. 2,820,642; i.e., to limit the movement of load carrying members mounted on the rails of a transportation trailer similar to the trailer shown in the aforementioned patent. Manually operable stop means, of the type shown and described in the above mentioned patent, require a minimum of two persons to effect the depression of and to maintain the arresting members thereof in a lowered position whereby cargo and/or equipment may be transferred from the rails of one trailer to the rails of another trailer.

Accordingly it is an object of the present invention to provide depressor and stop means, i.e., of the type associated with load carrying rail members of material handling equipment and the like, that functions automatically at such times as corresponding load carrying rail members of a similar set of material handling equipment are maneuvered into an aligned end-to-end and contacting relation.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 is a perspective view of a pair of aligned and abutting rail members showing one embodiment of the depressor and stop means as disclosed herein.

FIGURE 2 is a side elevational view of the rails and depressor and stop means of FIGURE 1 in which the rail ends are spaced from each other.

FIGURE 3 is a section view of the depressor and stop means as viewed along the line 3—3 of FIGURE 2.

FIGURE 4 is a side elevational view of another embodiment of the depressor and stop means as disclosed herein, the view being similar to that shown in FIGURE 2.

FIGURE 5 is a sectional view of the depressor and stop means as viewed along the line 5—5 of FIGURE 4.

The depressor and stop means as disclosed herein consists basically of only one moving part which is actuated by similar or like means mounted on a mating rail. The present depressor and stop means includes a stop pin mounted on a load carrying rail in a manner allowing it to be actuated between elevated and a lowered position with respect to the upper surface of the load carrying-rail on which it is mounted. A clevis-like member functions to actuate the aforementioned pin member to its lowered position simultaneously, or substantially so, as a pair of rails or similar members are maneuvered into aligned and abutting relation. The pin member is returned to its elevated position simultaneously, or substantially so, as the aforementioned pair of rails are disengaged. Both depressing and elevating movements of the pin are entirely automatic requiring no manual assistance. However, the clevis members of the present depressor and stop means does not in any way inhibit manual operation of the pin member between its elevated and lowered positions.

Referring now to the drawings, a preferred embodiment of the depressor and stop means as disclosed herein is shown in FIGURES 1–3 in which members 11 and 12 constitute load carrying rails of a transportation trailer or the like mounted in a manner substantially as shown in the aforementioned patent. In the present embodiment the rails 11 and 12 constitute structural shapes fabricated from I-beam stock. A pair of depressor and stop means, identified in their entirety by the numerals 14 and 14a, are mounted at adjacent ends of the rails 11 and 12. Although the depressor and stop means 14 and 14a are utilized as right and left hand members, respectively, their construction is identical, accordingly the description of one will apply equally well to the other. Also shown in FIGURES 1 and 2 is fastening means 16 comprising male and female ends and also a pin 18. It will be apparent that the fastening means 16 functions to align the rails 11 and 12 and maintain contact therebetween at such time as the ends of means 16 having a mating relation and the pin 18 is inserted in the apertures 19. A clip member 17, mounted on the web at the end of the rail 11, functions to further and more completely align the rails 11 and 12. The fastening means 16 and member 17 constitute no part of the present invention, for this reason a more complete description thereof is deemed unnecessary.

The stop means 14 includes a clevis-like member 21, a hanger member 22, a pin member 23 and spring means 24.

The hanger member 22 is L-shaped having arm portions 26 and 27. As assembled the member 22 is secured to the web portion of the rail 12 with the arm 26 extending normal to the web as best seen in FIGURE 3. The member 22 is mounted on the web of the rail 12 at a position approximately mid-way between the flanges thereof so that the top and bottom surfaces of the arm 26 have a parallel relation with respect to the upper surface of the rail 12. A circular aperture is provided in the arm portion 26 and is aligned with a similar aperture provided in the upper flange of the rail 12.

The clevis-like member 21 is U-shaped having aligned elongated slots 28 in its leg portions, the longitudinal axes of the slots 28 having a parallel relation with respect to the upper edges of the member 22. Aligned elongated slots 31 are also provided in the leg portions of the member 21; the longitudinal axes of these slots having an angular relation with respect to the longitudinal axes of the slots 28. The included angle between the axes of the slots 28 and 31, as best seen in FIGURE 2, is approximately 30° as indicated by the Greek letter α. The function of the slots 28 and 31 will become more apparent as the disclosure progresses.

The pin member 23 is fabricated of hardened tool steel, it is circular in cross-section and has a diameter providing a sliding fit in the aligned apertures provided in the arm 26 and rail 12. A diametrical extending bore 30 is provided adjacent one end of the pin 23 and an annular shoulder 32 adjacent its other end, the exact location of the shoulder 32 will be discussed further as the disclosure progresses.

The components comprising the depressor and stop means 14 are assembled substantially as illustrated in FIGURES 1–3. In their assembled relation it will be seen that the pin 23 is positioned in the aligned holes provided in the arm 26 and rail 12, the spring means 24 is compressed and surrounds the pin 23 and is located between the shoulder 32 and upper face of the arm 26. The clevis-like member 21 embraces the pin 23 and the

3 member 21, together with the hanger member 22, are secured to the web of the rail 12 by means of a pair of bolt members 33. Spacers or sleeve members 34 are utilized to provide bearing surfaces for the member 21 as translating movement occurs therebetween and the bolt members 33. Also the sleeve members 34 provide bottoming means for the nuts of the bolt members 33 thereby maintaining a fixed relation between certain components of the depressor and stop means 12 and the rail member 12 and at the same time allow free movement between other parts thereof.

The bore 30 has a hardened pin 36 mounted therein which extends through the slots 31. It will be seen that the pin 36 extends a greater distance to the right than to the left of the pin 23 as viewed in FIGURE 3. The greater length of the pin 36 extending to the right provides means whereby the pin 23 may be manually actuated between its elevated and lowered positions at such times as it may become necessary to do so.

The structural features of the depressor and stop means having been described the exact relation of various components thereof and their operation will become more apparent from the following description of their operation.

In operation it will be assumed that the rails 11 and 12 have been maneuvered into an aligned but spaced relation substantially as shown in FIGURE 2. As the rails 11 and 12 are caused to approach each other the male and female portions of the fastening means 16 contact each other and function in an obvious manner to provide absolute alignment of the rails 11 and 12. Upon further movement of the rails the clevis members 21 contact each other and are urged toward the other end of the respective rail to which they are attached. This movement is made possible by the grooves 28, in other words the members 21 slide on the bolt members 33. Prior to the movement just described, the upper end of the pins 23 extend a predetermined distance above the upper surface of the rails with which they are associated. This distance is indicated by the letter H, the position of the pin 23 at this time is referred to as the elevated position thereof as shown by solid line construction in FIGURE 3.

As the clevis members 21 are urged further toward the opposite end of the rail to which they are attached a camming action is imparted to the pin members 36 as the latter is caused to move toward the lower end of the slots 31. It will be apparent that the vertical distance (inclination) of the slot 31, indicated by the letter $h$ in FIGURES 2 and 3, must be equal to or exceed the distance H. Thus, at such time as members 21 are moved inboard or completely depressed, the pins 23 will be depressed with respect to the upper surfaces of the rails 11 and 12. This position of the pins 23 is referred to as the lowered positions thereof. The positions of the clevis members 21, at such times as they are completely urged inboard with respect to the rail with which they are associated, is hereinafter referred to as their depressed positions. Also the position of the clevis members 21 as shown in FIGURE 2—that is at such times as they project outboard of the rail member to which they are attached, is hereinafter referred to as their normal positions.

By referring to FIGURE 2 it will now be seen that the pin 23, when in its elevated position, effectively provides stop means for a carriage member as shown in FIGURES 19 and 20 of U.S. Patent No. 2,820,642. Also it will be apparent that with the pin 23 in its lowered position, the upper surfaces of the rails 11 and 12 are rendered free of any obstruction and carriage means mounted thereon will be free to roll from the rail 11 to the rail 12 or in the reverse direction.

Referring now to FIGURES 4 and 5, here a second embodiment of the depressor and stop means as disclosed herein is shown. The second embodiment functions and its construction is somewhat similar to that just described in connection with the depressor and stop means shown in FIGURES 1–3, accordingly the same numerals will be used in the specification and drawings to identify like parts common to each embodiment.

The depressor and stop means of the second embodiment, identified in its entirety by the numeral 41, includes a clevis-like member 42, a hanger member 22, a pin member 23 and spring means 24. These components are assembled as shown in FIGURES 4 and 5.

In this embodiment it will be seen that the clevis member 42 pivots about a single bolt member 33 and sleeve or spacer member 34 and does not have a translating movement as the clevis member 21 of the previous embodiment. In this respect it will be noticed that closed ends of the members 42 have arcuate portions which provide a rolling action upon contact with other members 42 or similar structure.

The clevis members 42 are also provided with aligned slots 43 the longitudinal axes of which assume a horizontal attitude prior to the time they are pivotally moved from their normal positions as shown by solid line construction in FIGURE 4. The dotted line positions of the members 42, shown in FIGURE 4 is hereinafter referred to as their depressed positions. It will also be apparent that the elevated and lowered positions of the pins 23 is the same as those previously described in connection with the first embodiment.

It will now be apparent that when suitable movement is imparted to the members 42 they will be moved from their normal to their depressed positions. Such pivotal movement of the members 42 results in the pins 23 being moved through a distance H from their elevated to their lowered positions. This movement of the pins 23 is due to the camming action provided by the slots 43 acting on the pins 36. Again the vertical travel $h$ of the pin 36 must equal or exceed the distance H.

Thus it will be seen that two embodiments of the depressor and stop means are disclosed which function automatically as the rails 11 and 12 are maneuvered into aligned, abutting and subsequently contacting relation. At such times as the pins 23 are in their elevated positions they effectively provide adequate means adapted to arrest excessive movement of carriage means mounted on the rail members 11 and 12. Also at such times as the pins 23 are depressed it will be apparent that the upper surfaces of the rails 11 and 12 are rendered free of obstructions and components and/or equipment mounted thereon( on carriage means) are free to be transferred from one rail to the other.

While in order to comply with the statute, the invention has been described in language more or less specific as to structural features it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

I claim:

1. In material handling equipment the combination comprising: a rail member having flanges at least one of which defines a plane outer surface; a clevis member; first means mounting said clevis member on said rail member for movement between normal and depressed positions; a pin member; second means mounting one end of said pin member in said clevis member and the other end in an aperture provided in said one flange for movement between elevated and a lowered positions; and said second means including camming means functioning to move said pin member from said elevated to said lowered position in response to forces moving said clevis member from said normal position to said depressed position.

2. In material handling equipment the combination as set forth in claim 1; including spring means surrounding said pin member adapted to return said clevis member to said normal position at such time as said forces are no longer acting thereon.

3. In material handling equipment the combination as set forth in claim 2: in which said first means constitutes a pair of bolt members spaced from each other and extending through slots provided in said clevis member and the movement of said clevis member in moving between said normal and depressed positions constitutes a linear movement.

4. In material handling equipment the combination as set forth in claim 2: in which said first means constitutes a single bolt member and the movement of said clevis member in moving between said normal and depressed positions constitutes a pivotal movement.

No references cited.